(12) United States Patent
Son et al.

(10) Patent No.: US 9,023,479 B2
(45) Date of Patent: May 5, 2015

(54) COATING COMPOSITION FOR LOW REFRACTIVE LAYER INCLUDING FLUORINE-CONTAINING COMPOUND, ANTI-REFLECTION FILM USING THE SAME, POLARIZER AND IMAGE DISPLAY DEVICE INCLUDING THE SAME

(71) Applicant: SK Innovation Co., Ltd., Seoul (KR)

(72) Inventors: Sung Ho Son, Daejeon (KR); Yun Bong Kim, Daejeon (KR); Won Seok Jang, Daejeon (KR); Yong Gyun Cho, Daejeon (KR)

(73) Assignee: SK Innovation Co., Ltd., Seoul (JP)

( * ) Notice: Subject to any disclaimer, the term of this patent is extended or adjusted under 35 U.S.C. 154(b) by 254 days.

(21) Appl. No.: 13/666,234

(22) Filed: Nov. 1, 2012

(65) Prior Publication Data

US 2013/0302623 A1 Nov. 14, 2013

(30) Foreign Application Priority Data

Nov. 4, 2011 (KR) ........................ 10-2011-0114392

(51) Int. Cl.
| | |
|---|---|
| *C07F 7/04* | (2006.01) |
| *C07F 7/12* | (2006.01) |
| *C07F 7/16* | (2006.01) |
| *C07F 7/18* | (2006.01) |
| *C07F 7/02* | (2006.01) |
| *C07F 7/00* | (2006.01) |
| *C08L 83/04* | (2006.01) |
| *C08J 5/18* | (2006.01) |
| *G02B 1/11* | (2006.01) |
| *C09D 4/00* | (2006.01) |
| *G02B 1/04* | (2006.01) |
| *C08F 222/18* | (2006.01) |
| *C08F 230/08* | (2006.01) |

(52) U.S. Cl.
CPC .... *G02B 1/111* (2013.01); *C09D 4/00* (2013.01); *C08F 222/18* (2013.01); *C08F 230/08* (2013.01); *G02B 1/04* (2013.01)

(58) Field of Classification Search
CPC .............. C08F 2/00; C08G 2/00; C08K 3/00; C08L 1/00; C09D 1/00; C01B 3/00
USPC ................... 556/400; 522/1; 428/400
See application file for complete search history.

(56) References Cited

U.S. PATENT DOCUMENTS

| | | | | | |
|---|---|---|---|---|---|
| 2,800,494 | A | * | 7/1957 | Haluska ........................ | 556/450 |
| 2,922,806 | A | * | 1/1960 | Merker ......................... | 556/440 |
| 2,956,044 | A | * | 10/1960 | Merker ......................... | 526/279 |
| 3,317,369 | A | * | 5/1967 | Clark et al. .................... | 442/266 |
| 3,324,074 | A | * | 6/1967 | McManimie ................. | 526/279 |
| 3,377,371 | A | * | 4/1968 | Quaal .......................... | 556/440 |
| 3,427,336 | A | * | 2/1969 | Tiers ............................ | 556/431 |
| 3,700,714 | A | * | 10/1972 | Hamilton et al. ............. | 556/440 |
| 3,746,734 | A | * | 7/1973 | Berger et al. ................. | 556/440 |
| 3,818,064 | A | * | 6/1974 | Kim .............................. | 556/431 |
| 4,189,546 | A | * | 2/1980 | Deichert et al. ............... | 528/26 |
| 4,486,577 | A | * | 12/1984 | Mueller et al. ................ | 525/474 |
| 4,605,712 | A | * | 8/1986 | Mueller et al. ................ | 525/474 |
| 4,723,025 | A | * | 2/1988 | Uchida et al. ................. | 556/440 |
| 4,742,136 | A | * | 5/1988 | Uchida ......................... | 526/279 |
| 4,759,991 | A | * | 7/1988 | Kanno et al. .................. | 428/447 |
| 4,810,764 | A | * | 3/1989 | Friends et al. ................ | 526/245 |
| 5,135,297 | A | * | 8/1992 | Valint, Jr. .................. | 351/159.73 |
| 5,158,717 | A | * | 10/1992 | Lai ............................... | 264/1.1 |
| 5,177,165 | A | * | 1/1993 | Valint et al. .................. | 526/245 |
| 5,204,441 | A | * | 4/1993 | Baum et al. .................... | 528/70 |
| 5,219,965 | A | * | 6/1993 | Valint et al. .................. | 526/245 |
| 5,240,774 | A | * | 8/1993 | Ogawa et al. ................ | 428/411.1 |
| 5,453,528 | A | * | 9/1995 | Boutevin et al. ............. | 556/431 |
| 6,056,945 | A | * | 5/2000 | Cauwet-Martin et al. ... | 424/70.1 |
| 6,306,563 | B1 | * | 10/2001 | Xu et al. ...................... | 430/321 |
| 6,323,361 | B1 | * | 11/2001 | Wu et al. ...................... | 560/223 |
| 6,350,439 | B1 | * | 2/2002 | Dupuis ....................... | 424/70.12 |
| 6,471,952 | B1 | * | 10/2002 | Dubief et al. ............... | 424/70.12 |
| 6,596,294 | B2 | * | 7/2003 | Lai et al. ...................... | 424/422 |
| 6,716,534 | B2 | * | 4/2004 | Moore et al. .................. | 428/447 |
| 7,078,445 | B2 | * | 7/2006 | Xu et al. ....................... | 522/172 |
| 7,247,386 | B2 | * | 7/2007 | Hooftman et al. ............ | 428/447 |
| 8,030,423 | B2 | * | 10/2011 | Salamone et al. ............ | 526/279 |
| 8,481,662 | B2 | * | 7/2013 | Liu et al. ...................... | 526/279 |
| 8,637,621 | B2 | * | 1/2014 | Iwata et al. ................... | 526/279 |
| 2001/0037001 | A1 | * | 11/2001 | Muller et al. ............... | 525/329.4 |

(Continued)

FOREIGN PATENT DOCUMENTS

| | | | |
|---|---|---|---|
| JP | 10182745 A | | 7/1998 |
| JP | 2000-281791 | * | 1/2000 |

(Continued)

OTHER PUBLICATIONS

Machine translation of JP 2000-281791 retrieved Jan. 16, 2015.*

(Continued)

*Primary Examiner* — Callie Shosho
*Assistant Examiner* — Michael B Nelson
(74) *Attorney, Agent, or Firm* — The Webb Law Firm

(57) ABSTRACT

Provided are a coating composition for low refractive layer including fluorine-containing compound of the following Chemical Formula 1, an anti-reflection film using the same, and a polarizer and an image display device including the same, wherein the fluorine-containing compound of the following Chemical Formula 1 has a low refractive index of 1.28 to 1.40, thereby making it possible to easily adjust a refractive index of the anti-reflection film and be usefully used as a coating material of the anti-reflection film having an excellent mechanical property such as durability, or the like.

[Chemical Formula 1]

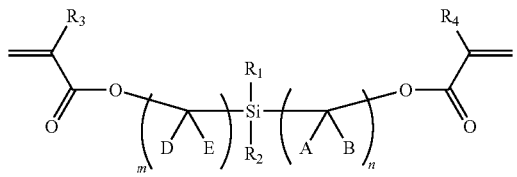

12 Claims, No Drawings

(56) References Cited

U.S. PATENT DOCUMENTS

| | | |
|---|---|---|
| 2002/0080482 A1* | 6/2002 | Watanabe et al. ............. 359/452 |
| 2002/0115820 A1* | 8/2002 | Wang et al. .................... 528/401 |
| 2003/0008154 A1* | 1/2003 | Aguado et al. ................. 428/447 |
| 2004/0006188 A1* | 1/2004 | Kim et al. ...................... 526/245 |
| 2007/0021563 A1* | 1/2007 | Kasai et al. .................... 525/191 |
| 2007/0135602 A1* | 6/2007 | Yamahiro et al. ............. 526/242 |
| 2007/0184002 A1* | 8/2007 | Vrignaud et al. ............. 424/70.7 |
| 2007/0190008 A1* | 8/2007 | Campain et al. ............. 424/70.2 |
| 2007/0207298 A1* | 9/2007 | Suzuki et al. .................. 428/216 |
| 2007/0249858 A1* | 10/2007 | Kinsho et al. ................. 560/223 |
| 2007/0291223 A1* | 12/2007 | Chen et al. ................ 351/160 R |
| 2007/0296914 A1* | 12/2007 | Hong et al. ................ 351/160 H |
| 2008/0003252 A1* | 1/2008 | Lai et al. ........................ 424/423 |
| 2008/0004410 A1* | 1/2008 | Lai et al. ........................ 526/264 |
| 2008/0176973 A1* | 7/2008 | Qiu et al. ........................ 523/135 |
| 2009/0025609 A1* | 1/2009 | Egami et al. .............. 106/287.12 |
| 2009/0080073 A1* | 3/2009 | Irita et al. ....................... 359/485 |
| 2009/0143598 A1* | 6/2009 | Herzog et al. ................. 548/110 |
| 2009/0176097 A1* | 7/2009 | Brown et al. .................. 428/403 |
| 2009/0234089 A1* | 9/2009 | Ueyama et al. ................ 526/279 |
| 2010/0029889 A1* | 2/2010 | Yamane et al. .................. 528/25 |
| 2010/0076109 A1* | 3/2010 | Kang et al. ....................... 522/78 |
| 2010/0280146 A1* | 11/2010 | Vanderlaan et al. ........... 523/107 |
| 2011/0123446 A1* | 5/2011 | DeSimone et al. ........... 424/1.65 |
| 2012/0076532 A1* | 3/2012 | Hoshio ........................... 399/111 |
| 2012/0088861 A1* | 4/2012 | Huang et al. ................... 523/107 |
| 2012/0103330 A1* | 5/2012 | David et al. ............... 128/203.12 |
| 2012/0184696 A1* | 7/2012 | Broad et al. ................... 526/245 |
| 2012/0308802 A1* | 12/2012 | Jung et al. ...................... 428/220 |
| 2013/0084442 A1* | 4/2013 | Akutagawa et al. ........... 428/212 |
| 2013/0135726 A1* | 5/2013 | Wakizaka et al. ........ 359/488.01 |
| 2013/0289080 A1* | 10/2013 | Masse et al. ................... 514/345 |

FOREIGN PATENT DOCUMENTS

| | | |
|---|---|---|
| KR | 100787770 B1 | 12/2007 |
| KR | 1020080005722 A | 1/2008 |
| KR | 1020090101495 A | 9/2009 |
| KR | 1020100121284 A | 11/2010 |
| WO | WO 2011/096701 * | 8/2011 |

OTHER PUBLICATIONS

A Top Surface Imaging Approach Based on the Light-Induced Formation of Dry-Etch Barriers, Schaedeli et al., May 5, 1995.*

Macromolecules, Synthesis of Fluorinated Polysiloxanes, Boutevin et al., Feb. 4, 1991.*

Journal of Fluorine Chemistry, Functionalized fluoroalkyl and alkenyl silanes: Preparations, reactions, and synthetic applications, Uneyama, May 27, 2008.*

Journal of Fluorine Chemistry, Preparation of 1,1,2-trifluoro-2-trimethylsilylethylene, Jairaj et al., Nov. 30, 2002.*

* cited by examiner

COATING COMPOSITION FOR LOW REFRACTIVE LAYER INCLUDING FLUORINE-CONTAINING COMPOUND, ANTI-REFLECTION FILM USING THE SAME, POLARIZER AND IMAGE DISPLAY DEVICE INCLUDING THE SAME

CROSS-REFERENCE TO RELATED APPLICATIONS

This application claims priority under 35 U.S.C. §119 to Korean Patent Application No. 10-2011-0114392, filed on Nov. 4, 2011, in the Korean Intellectual Property Office, the disclosure of which is incorporated herein by reference in its entirety.

TECHNICAL FIELD

The following disclosure relates to a coating composition for a low refractive layer including fluorine-containing compound of the following Chemical Formula 1, an anti-reflection film using the same, and a polarizer and an image display device including the same, wherein the fluorine-containing compound of the following Chemical Formula 1 has a low refractive index of 1.28 to 1.40, thereby making it possible to easily adjust a refractive index of the anti-reflection film and be usefully used as a coating material of the anti-reflection film having excellent mechanical property such as durability, or the like.

[Chemical Formula 1]

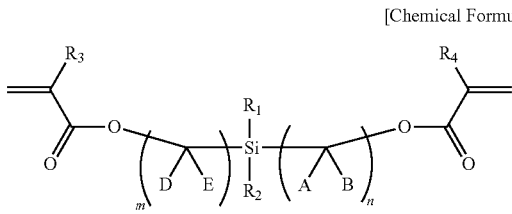

BACKGROUND

Modern people have been introduced to various displays such as a picture tube, for example, a cathode-ray tube (CRT) for a monitor, a color picture tube (CPT) for a television, a thin film transistor liquid crystal display (TFT-LCD) polarizer, a plasma display panel (PDP) filter, a RPTS filter, a liquid crystal of a mobile phone, a watch, a photograph, and a frame. In the case in which these displays are exposed to light such as natural light, reflected light may cause eyes to be tired or a headache, and eyes may not clearly focus on an image displayed in the display, such that contrast may be deteriorated. In order to solve these problems, research into a technology of forming an anti-reflection film using a method of forming a film having a refractive index lower than that of a substrate on the substrate to reduce a reflectance has been conducted. In order to have this anti-reflection function, the anti-reflection film has a structure in which a hard coat layer including hard coating solution applied thereto, a high refractive layer including coating solution having a refractive index of 1.6 or more applied thereto, and a low refractive layer including coating solution having a low refractive index of 1.3 to 1.5 applied thereto are coated on a glass, a plastic film. Recently, in order to reduce a complicated process, a structure of the anti-reflection film has been changed into a two layer structure in which a low refractive layer is directly applied to a hard coat layer. This low refractive layer should have physical properties such as high visible light transmissivity, durability, anti-contamination, mechanical strength, and the like, in addition to a low refractive index. In addition, at the same time, the low refractive layer should be easily coated by a mass-coating method such as a roll coating method, a gravure coating method, a slide coating method, a spray coating method, a screen printing method, or the like and easily cured by a continuous curing method such as ultraviolet (UV) curing method.

As a fluorine based material having a low refractive index for anti-reflection, a fluorine based material having a low refractive index produced by polymerizing a monomer composition containing multi-functional fluorine-containing (meth)acrylic ester has been disclosed in Japanese Laid-Open Patent Publication No. 1998-182745. However, in the case of acrylic ester containing a fluoroalkyl group, when a content of fluorine is decreased, a refractive index may be decreased, and when the content of fluorine is increased, transparency may be deteriorated.

As described above, various fluorine based coating solution compositions have been examined as an anti-reflection material for a low refractive layer in the related art. However, a material having a low refractive index enough to obtain the anti-reflection effect and mechanical strength, resistance to a scratch using a single coating layer and a coating method using the same have been required in the art.

SUMMARY

An embodiment of the present invention is directed to providing a coating composition for a low refractive layer including fluorine-containing compound as a material having a low refractive index enough to obtain the anti-reflection effect and a strong mechanical strength resistant to a scratch using a single coating layer, an anti-reflection film using the same, and a polarizer and image display device including the same.

In one general aspect, there is provided a coating composition for a low refractive layer including fluorine-containing compound of the following Chemical Formula 1, an anti-reflection film using the same, and a polarizer and an image display device including the same, wherein the fluorine-containing compound of the following Chemical Formula 1 has a low refractive index of 1.28 to 1.40, thereby making it possible to easily adjust a refractive index of the anti-reflection film and be usefully used as a coating material of the anti-reflection film having an excellent mechanical property such as durability, or the like.

[Chemical Formula 1]

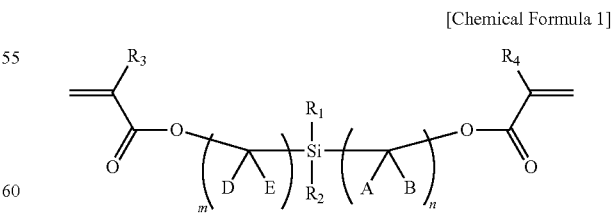

in Chemical Formula 1,
$R_1$ to $R_4$ are each independently hydrogen, (C1-C20)alkyl, or (C6-C20)aryl, and when $R_1$ and $R_2$ are not hydrogen at the same time;
m and n are each independently an integer of 2 to 10;

A, B, D, and E are each independently hydrogen, fluorine, or (C1-C4)alkyl, provided that a content of fluorine in a content of the entire atoms of A, B, D, and E is 50% or more; and the alkyl and aryl of $R_1$ to $R_4$ may be further substituted with fluorine.

The fluorine-containing compound of the Chemical Formula 1 has a refractive index of 1.28 to 1.40, and preferably has a low refractive index of 1.28 to 1.35, thereby making it possible to easily adjust the refractive index of the anti-reflection film and be usefully used as the coating material of the anti-reflection film having excellent mechanical property such as durability, or the like.

Examples of the fluorine-containing compound of Chemical Formula 1 include the following compounds, but are not limited thereto.

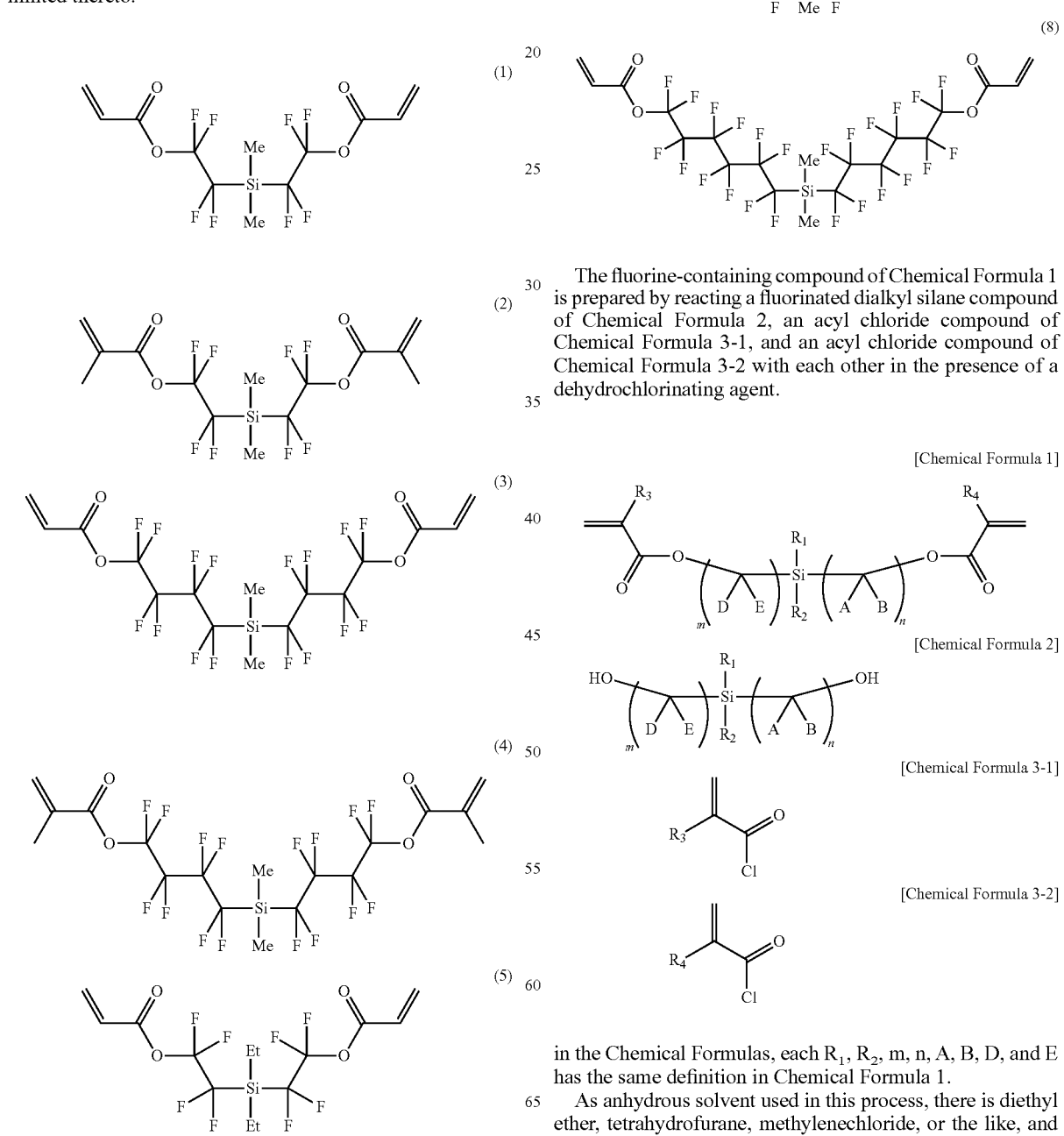

The fluorine-containing compound of Chemical Formula 1 is prepared by reacting a fluorinated dialkyl silane compound of Chemical Formula 2, an acyl chloride compound of Chemical Formula 3-1, and an acyl chloride compound of Chemical Formula 3-2 with each other in the presence of a dehydrochlorinating agent.

in the Chemical Formulas, each $R_1$, $R_2$, m, n, A, B, D, and E has the same definition in Chemical Formula 1.

As anhydrous solvent used in this process, there is diethyl ether, tetrahydrofurane, methylenechloride, or the like, and 2.0 to 2.5 equivalents of dehydrochlorinating agent may be used based on the fluorinated dialkyl silane compound of Chemical Formula 2. In addition, as the used dehydrochlorinating agent, there is pyridine, triethylamine, or the like. The reaction temperature may be changed according to the used solvent, but is generally 0 to 25° C. A reaction time may be changed according to the reaction temperature and the used solvent, but may be generally 30 minutes to 6 hours, and preferably 2 hours or less.

The fluorinated dialkyl silane compound of Chemical Formula 2 is prepared by two methods; one method is a method of reacting a silane compound of the following Chemical Formula 4, a fluorinated bromoalcohol compound of Chemical Formula 5-1, and a fluorinated bromoalcohol compound of Chemical Formula 5-2 with a Grignard reagent by using magnesium as a catalyst at a temperature of −78° C. to 25° C., and the other method is a method of reacting a silane compound of Chemical Formula 4, a fluorinated bromoalcohol compound of Chemical Formula 5-1, and a fluorinated bromoalcohol compound of Chemical Formula 5-2 with an anionic reagent in the presence of (C1-C10)alkyl lithium at a temperature of −78° C. to 25° C.

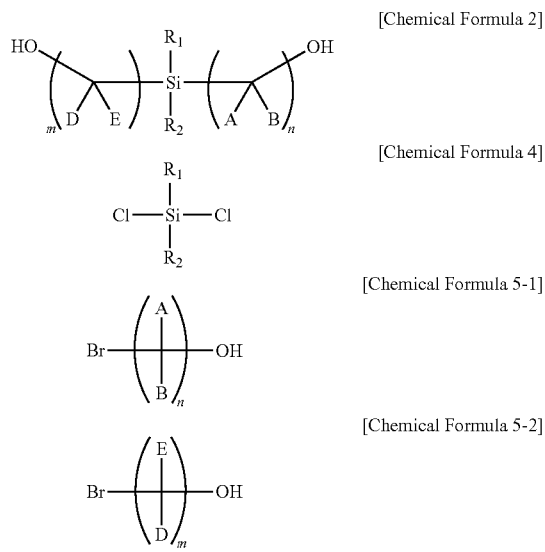

[Chemical Formula 2]

[Chemical Formula 4]

[Chemical Formula 5-1]

[Chemical Formula 5-2]

In the Chemical Formulas, each $R_1$, $R_2$, m, n, A, B, D, and E has the same definition in Chemical Formula 1.

A single solvent such as diethyl ether, tetrahydrofurane, hexane, heptane, or the like and a mixed solvent in which at least two solvents are mixed with each other are used as the anhydrous solvent in this process. 2.0 to 2.1 equivalents of magnesium may be generally used based on the silane compound of Chemical Formula 4. As the alkyl lithium organometallic reagent, there are n-butyllithium, sec-butyllithium, tert-butyllithium, and the like. Generally, 2.0 to 2.1 equivalents of the alkyl lithium organometallic reagent may be used based on the silane compound of Chemical Formula 4. A reaction temperature may be changed according to the used solvent, but is generally −78° C. to 25° C. Preferably, a chloro-lithium substitution reaction is carried out at −78° C., and a reaction with fluorinated bromoalcohol compounds of Chemical Formulas 5-1 and 5-2 is carried out at −10° C. to 25° C. A reaction time may be changed according to the reaction temperature and the used solvent, but is generally 30 minutes to 6 hours, and preferably 2 hours or less.

The content of the fluorine-containing compound of Chemical Formula 1 is 1 to 50 weight % of entire solid content of the coating composition for a low refractive layer. In the case in which the content is lower than 1 weight %, it is difficult to obtain anti-reflection effect, and in the case in which the content is higher than 50 weight %, it is difficult to obtain mechanical property. Therefore, it is preferable that the range of the content is maintained.

The coating composition for a low refractive layer according to the exemplary embodiment of the present invention may contain the fluorine-containing compound of the Chemical Formula 1, a compound having an acrylic unsaturated group, a low refractive index particle, and a solvent.

More specifically, the coating composition for a low refractive layer contains the fluorine-containing compound of the Chemical Formula 1, the compound having an acrylic unsaturated group, the low refractive index particle, and a solvent to have a solid content of 3 to 8 weight %, wherein the solid may contain the fluorine-containing compound of the Chemical Formula 1 in a content of 1 to 50 weight %, the compound having an acrylic unsaturated group in a content of 5 to 40 weight %, and the low refractive index particle in a content of 1 to 60 weight %.

In the case in which the solid content of the coating composition for a low refractive layer is lower than 3 weight %, a long time may be consumed in a curing process and economic efficiency may be reduced, and in the case in which the solid content is higher than 8 weight %, a viscosity of the coating solution is increased, such that it may be difficult to perform a thin-film coating and a degree of planarization of the coated film may be deteriorated.

The compound having an acrylic unsaturated group is used to improve a curing degree of a curing layer. Here, in the case in which the content of the compound having an acrylic unsaturated group is lower than 5 weight % of the solid content of the coating composition for a low refractive layer, there is a problem in curing a surface of the low refractive layer, and in the case in which the content is higher than 40 weight %, the refractive index of the low refractive layer is increased, such that the anti-reflection effect may be deteriorated. The compound having an acrylic unsaturated group is (meth)acrylate, and (metha)acrylate means acrylate or methacrylate in the present invention. Specific examples of (meth) acrylate include ethyl(meth)acrylate, ethylhexyl(meth)acrylate, trimethanolpropanetri(meth)acrylate, hexanediol(meth)acrylate, tripropyleneglycoldi(meth)acrylate, diethyleneglycoldi(meth)acrylate, pentaerythritoltri(meth) acrylate, dipentaerythritolhexa(meth)acrylate, 1,6-hexanedioldi(meth)acrylate, neopentylglycoldi(meth)acrylate, and the like.

As the low refractive particle, LiF, MgF, 3NaF, AlF, $Na_3AlF_6$, or hollow silica having an empty space therein may be used. The low refractive particle is used to lower the refractive index to improve anti-reflection characteristics and scratch resistance and may have a particle size of 1 nm to 100 nm. In the case in which the particle size is smaller than 1 nm, a coagulation phenomenon may be increased, and in the case in which the particle size is larger than 100 nm, transparency may be deteriorated due to a whitening phenomenon. The low refractive particle may be contained in a content of 1 to 60 weight % in the entire solid content of the coating composition for a low refractive layer. When the content of the low refractive particle is smaller than 1 weight %, an improvement effect of the scratch resistance by the improvement of interlayer adhesive strength and the anti-reflection effect may be weak, and when the content is higher than 60 weight %, visible light transmissivity may be slightly reduced in proportion to an amount of the used particle. Therefore, it may be preferable that the range of the content is maintained.

Any organic solvent may be used without limitation as long as the solvent is suitable for dissolving the solid component. For example, alcohols, acetates, ketones, or aromatic solvents may be used. More specifically, methanol, ethanol, isopropylalcohol, butanol, 2-methoxyethanol, 2-ethoxyethanol, 2-butoxyethanol, 2-isopropoxyethanol, methylacetate, ethylacetate, butylacetate, methylethylketone, methylisobutylketone, cyclohexane, cyclohexanone, toluene, xylene, or benzene, or the like may be used, and at least two kinds thereof may be mixed to thereby be used. The solvent may be added so that the solid content of the coating composition for a low refractive layer is 3 to 8 weight %. In the case in which the solid content is lower than 3 weight %, a long time may be required in a curing process, such that economic efficiency may be reduced, and in the case in which the solid content is higher than weight %, the viscosity of the coating solution is increased, such that the thin-film coating may be difficult and the degree of planarization of the coating film may be deteriorated.

The coating composition for a low refractive layer according to the present invention may further include a photo-initiator, wherein the photo-initiator is a UV degradable compound, for example, α-aminoacetophenone, 1-hydroxy cyclohexylphenyl ketone, benzyl dimethyl ketal, hydroxyl dimethylaceto phenone, benzoin, benzoin methyl ether, benzoin ethyl ether, benzoin isopropyl ether, benzoin butyl ether, and the like, and may be contained in a content of 1 to 20 parts by weight based on 100 parts by weight of the fluorine-containing compound of the Chemical Formula 1. In the case in which the content of the photo-initiator is lower than 1 parts by weight, the lower coating composition may not be cured, and in the case in which the content is higher than 20 parts by weight, a crack may be generated in the low refractive layer due to excessive curing of the coating composition, such that scratch resistance and abrasion resistance may be deteriorated.

In addition, the coating composition for a low refractive layer according to the present invention may further include an additive as needed, and any additive may be used without limitation as long as the additive is generally used in the art. For example, a photo-stimulator, an antioxidant, a UV absorber, a UV stabilizer, a heat stabilizer, a thermal polymerization preventing agent, a leveling agent, a surfactant, a lubricant, or the like, may be used. In addition, the content of the additive may be in a range in which the property of the coating composition is not deteriorated.

In another general aspect, there is provided an anti-reflection film manufactured using the coating composition for a low refractive layer including fluorine-containing compound. The anti-reflection film is manufactured using the coating composition for a low refractive layer including fluorine-containing compound by the known method.

In the anti-reflection film, a hard coat layer and the low refractive layer sequentially formed on a transparent substrate may be formed by applying composition for a hard coat layer and the coating composition for a lower refractive layer according to the present invention in a suitable scheme such as a die-coating method, an air-knife coating method, a reverse roll coating method, a spray coating method, a blade coating method, a casting method, a gravure and spin coating method, or the like.

The anti-reflection film may include the low refractive layer formed using the coating composition for a low refractive layer and has a structure in which the low refractive layer is independently coated on the transparent substrate or the hard coat layer and the low refractive layer are sequentially coated on the transparent substrate. As the transparent substrate, any film may be used as long as the film is a transparent plastic film, and a polyethylene terephthalate film or a cellulose triacetate film may be preferably used. The transparent substrate film may have a thickness of 8 to 300 μm, and preferably 40 to 100 μm. The refractive index of the low refractive layer formed on the transparent substrate may be 1.28 to 1.40 at 25° C. When the refractive index of the low refractive layer is lower than the range, anti-reflection effect may be reduced, and when the refractive index of the low refractive layer is higher than the range, a predetermined color may be strong by the reflected light. The anti-reflection film manufactured as described above may have excellent scratch resistance and adherence characteristics in addition to excellent anti-reflection characteristics.

In another general aspect, there is provided a polarizer including the anti-reflection film. The polarizer is not particularly limited, but various kinds of polarizer may be used. As the polarizer, for example, there are a film obtained by allowing a hydrophilic polymer film such as a polyvinylalcohol film, an ethylene-vinylacetate copolymer partially saponificated film, and the like, to absorb iodine or a dichromatic material such as a diachronic dye to thereby be uniaxially drawn, and a polyene oriented film such as a dehydrated material of polyvinylalcohol or dehydrochlorinated material of polychlorovinyl. Among these polarizers, a polarizer consisting of the polyvinylalcohol film and the dichromatic material such as iodine, or the like may be preferable. A thickness of the polarizer is not particularly limited, but may be generally about 5 to 80 μm.

In another general aspect, there is provided an image display device including the anti-reflection film or the polarizer formed on a top surface of the display. For example, the polarizer having anti-reflection film according to the present invention formed therein is embedded in the display device, such that various display devices having excellent visibility may be manufactured. Further, the anti-reflection film according to the present invention may be attached to a window of the display device. The anti-reflection film according to the present invention may be preferably used in a reflective liquid crystal display (LCD), a transmissive LCD, semi-transmissive LCD or a LCD having various driving schemes such twisted nematic (TN) mode, super twisted nematic (STN) mode, offset codebook (OCB) mode hybrid alignment nematic (HAN) mode, vertical alignment (VA) mode, in-plane-switching (IPS) mode, or the like. In addition, the anti-reflection film according to the present invention may be used in various display devices such as a plasma display, a field emission display, an organic electroluminescent (EL) display, an inorganic EL display, electronic paper, or the like.

DETAILED DESCRIPTION OF EMBODIMENTS

In the following examples and comparative examples, effects of the present invention will be described in detail. The following examples are provided for illustrative purposes, and are not to limit the scope of the present invention.

Preparation Example 1

Preparation of Fluorine-Containing Compound

Various fluorine-containing compounds according to the present invention were prepared through the following first and second reaction process.
<First Reaction Process>
In a 5 L reaction flask, tetrahydrofuran (THF) was injected, and cooled to −78° C. Then 5 moles of silane compound described in the following Table 1 (reactant I), 5 moles of magnesium turning, and 5 moles of fluorinated bromoalcohol compound (reactant II) were sequentially put into the reaction flask, followed by stirring for 10 minutes, and then the mixture was stirred for 1.5 hours while the temperature was slowly raised to room temperature. After the stirring was completed, the reaction was terminated by dissolving 500 g of hydrochloric acid (HCl) in 1 L of water to add the dissolved material to the reaction flask, and then was left for 20 minutes. When the resultant was separated into water and a THF layer to thereby be transparent, after the THF layer was completely evaporated, a product, that is, a fluorinated dialkyl silane compound was separated and purified by using column chromatography. Yields (56.6 to 66.7%) of each of the prepared compounds and $^1$H NMR thereof were shown in the following Table 1.

TABLE 1

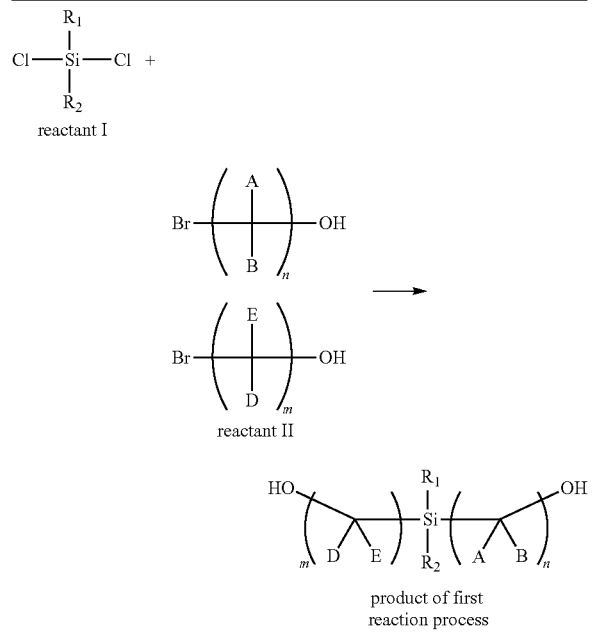

reactant I reactant II product of first reaction process

| No. | $R_1 = R_2$ | $A = B = D = E$ | $n = m$ | Yield of product of first reaction process | $^1$HNMR of product of first reaction process |
|---|---|---|---|---|---|
| a | Me | F | 2 | 66.7 | δ 2.00 (1H, s), 0.21 (3H, s) |
| b | Me | F | 4 | 58.2 | δ 2.03 (1H, s), 0.21 (3H, s) |
| c | Me | F | 6 | 56.6 | δ 2.05 (1H, s), 0.21 (3H, s) |
| d | Et | F | 2 | 61.3 | δ 2.00 (1H, s), 0.86 (3H, t), 0.66 (2H, q) |

<Second Reaction Process>

In a 3 L reaction flask, methylene chloride (MC) was injected, and 3 moles of acylchloride compound (reactant III) described in the following Tables 2 and 3 moles of obtained material in the first reaction process were added thereto at a room temperature, and then 11 moles of triethylamine was added thereto to react with the mixture for 1 hour. When the reaction was completed, water is added thereto and then the resultant was left for 20 minutes. When the resultant was separated into water and a MC layer became thereby transparent, after the MC layer was completely evaporated, a product, that is, a fluorinated dialkyl diacrylated silane compound was separated and purified by using column chromatography. A yield was 70.3 to 90.5%, and the yield of each of the prepared compounds and $^1$H NMR thereof were shown in the following Table 2. The refractive indexes of each of the compounds were measured using a 589 nm D-light tungsten lamp as a light source by the refractometer (model name: 2T, Japan ATAGO ABBE). The refractive indexes of each of the compounds were 1.28 to 1.40 as shown in Table 3.

TABLE 2

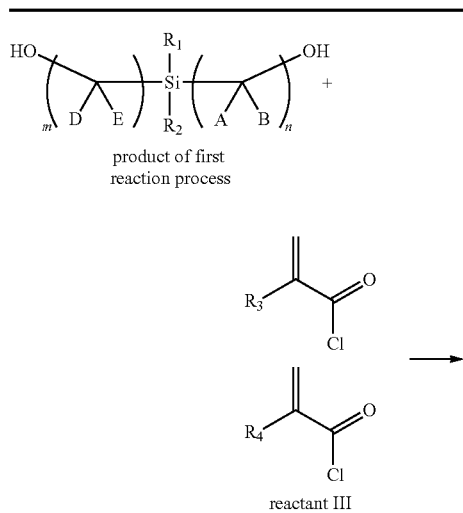

product of first reaction process reactant III

TABLE 2-continued

Structure of product of second reaction process:

$$\text{product of second reaction process}$$

with R_3, R_4 as acrylate/methacrylate groups; central Si with R_1, R_2; chain: $-O-(D-E)_m-Si(R_1)(R_2)-(A-B)_n-O-$

| No. | $R_1 = R_2$ | $A = B = D = E$ | $n = m$ | $R_3 = R_4$ | Yield of product of second reaction process | $^1$HNMR of product of second reaction process |
|---|---|---|---|---|---|---|
| 1 | Me | F | 2 | H | 90.5 | δ 6.27 (1H, dd), 6.05 (1H, q), 5.59 (1H, dd), 2.00 (1H, s), 0.21 (3H, s) |
| 2 | Me | F | 2 | Me | 83.3 | δ 6.27 (1H, dd), 6.05 (1H, q), 5.59 (1H, dd), 2.03 (1H, s), 0.21 (3H, s) |
| 3 | Me | F | 4 | H | 87.6 | δ 6.27 (1H, dd), 6.05 (1H, q), 5.59 (1H, dd), 2.04 (1H, s), 0.22 (3H, s) |
| 4 | Me | F | 4 | Me | 82.1 | δ 6.27 (1H, dd), 6.05 (1H, q), 5.59 (1H, dd), 2.06 (1H, s), 0.22 (3H, s) |
| 5 | Et | F | 2 | H | 87.0 | δ 6.27 (1H, dd), 6.05 (1H, q), 5.59 (1H, dd), 2.03 (1H, s), 1.33 (4H, m), 0.91 (3H, t), 0.61 (2H, t) |
| 6 | Et | F | 2 | n-Bu | 72.2 | δ 6.27 (1H, dd), 6.05 (1H, q), 5.59 (1H, dd), 2.05 (1H, s), 1.35 (4H, m), 0.92 (3H, t), 0.62 (2H, t) |
| 7 | Me | F | 6 | Et | 70.3 | δ 6.27 (1H, dd), 6.05 (1H, q), 5.59 (1H, dd), 2.04 (1H, s), 0.87 (3H, t), 0.66 (2H, q) |
| 8 | Me | F | 6 | H | 85.8 | δ 6.27 (1H, dd), 6.05 (1H, q), 5.59 (1H, dd), 2.02 (1H, s), 0.86 (3H, t), 0.65 (2H, q) |

TABLE 3

| No. | Structure | Refractive index |
|---|---|---|
| 1 | Diacrylate with fluorinated Si(Me)$_2$ core (acrylate end groups, -O-CF$_2$-CF$_2$-Si(Me)$_2$-CF$_2$-CF$_2$-O-) | 1.35 |
| 2 | Dimethacrylate with fluorinated Si(Me)$_2$ core (methacrylate end groups, -O-CF$_2$-CF$_2$-Si(Me)$_2$-CF$_2$-CF$_2$-O-) | 1.36 |

TABLE 3-continued

| No. | Structure | Refractive index |
|---|---|---|
| 3 | 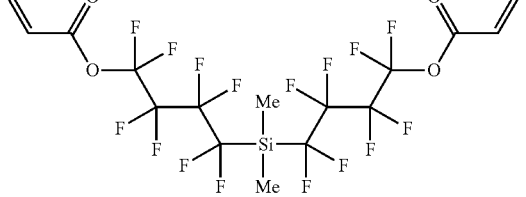 | 1.33 |
| 4 | 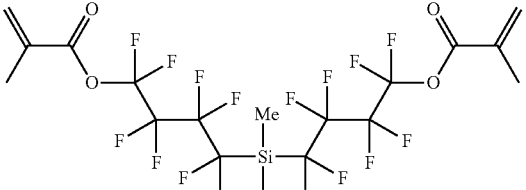 | 1.32 |
| 5 | 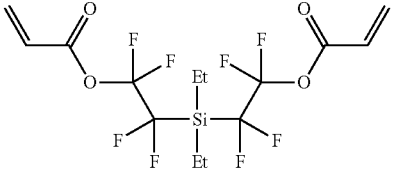 [SMILES: C=CC(=O)OC(F)(F)C(F)(F)[Si](C)(C)C(F)(F)C(F)(F)OC(=O)C=C] | 1.36 |
| 6 | 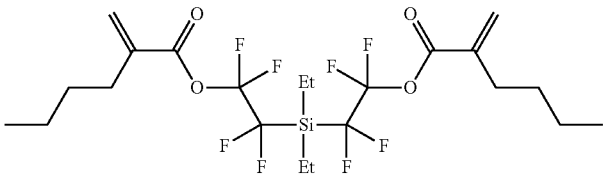 [SMILES: C=C(CCCC)C(=O)OC(F)(F)C(F)(F)[Si](CC)(CC)C(F)(F)C(F)(F)OC(=O)C(=C)CCCC] | 1.40 |
| 7 | 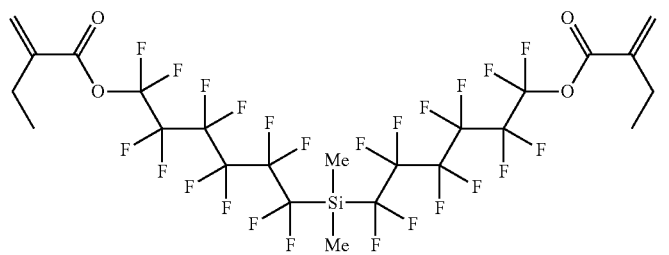 [SMILES: C=C(CC)C(=O)OC(F)(F)C(F)(F)C(F)(F)C(F)(F)C(F)(F)C(F)(F)[Si](C)(C)C(F)(F)C(F)(F)C(F)(F)C(F)(F)C(F)(F)C(F)(F)OC(=O)C(=C)CC] | 1.30 |
| 8 | 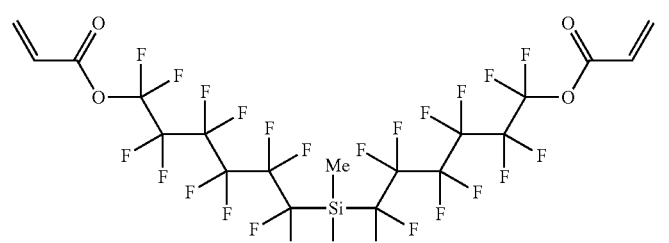 | 1.28 |

Example 1

Preparation of Coating Solution for a Low Refractive Layer 3 g of fluorine-containing compound (6) and 2.5 g of dipentaerythritolhexaacrylate (NK Chemical Company, A-DPH) were mixed with 224 g of methyl isobutyl ketone (MIBK) and were completely dissolved, and then 6 g of hollow silica (JGCCC) was mixed therewith. Then 0.3 g of α-aminoacetophenone (BASF, Irgacure 907) was added thereto as a photo-initiator, thereby preparing the coating solution for a low refractive layer.

(6)

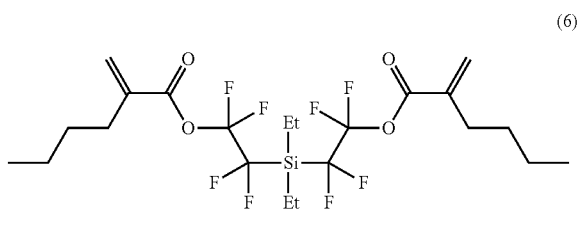 [SMILES: C=C(CCCC)C(=O)OC(F)(F)C(F)(F)[Si](CC)(CC)C(F)(F)C(F)(F)OC(=O)C(=C)CCCC]

Example 2

Preparation of Coating Solution for a Low Refractive Layer

The coating solution for a low refractive layer was prepared by the same method as that of Example 1 except for using a fluorine-containing compound (4).

(4)

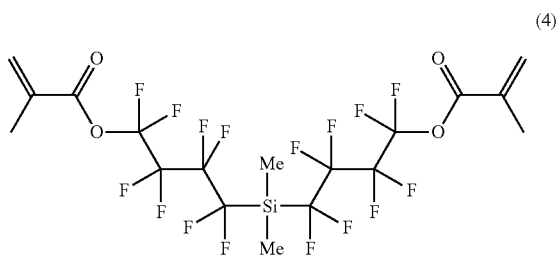 [SMILES: C=C(C)C(=O)OC(F)(F)C(F)(F)C(F)(F)C(F)(F)[Si](C)(C)C(F)(F)C(F)(F)C(F)(F)C(F)(F)OC(=O)C(=C)C]

Example 3

Preparation of Coating Solution for a Low Refractive Layer

The coating solution for a low refractive layer was prepared by the same method as that of Example 1 except for using a fluorine-containing compound (7).

(7)

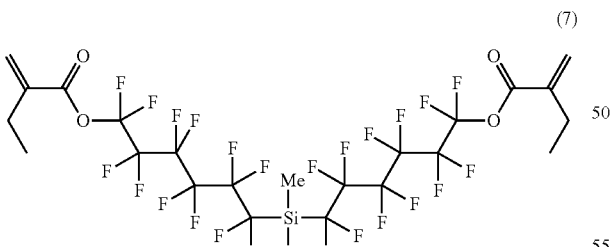

Example 4

Preparation of Coating Solution for a Low Refractive Layer

The coating solution for a low refractive layer was prepared by the same method as that of Example 1 except for using a fluorine-containing compound (2).

(2)

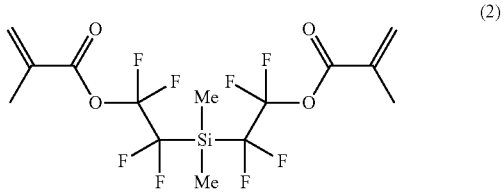 [SMILES: C=C(C)C(=O)OC(F)(F)C(F)(F)[Si](C)(C)C(F)(F)C(F)(F)OC(=O)C(=C)C]

Example 5

Manufacturing of an Anti-Reflection Film

In laminating a hard coat layer and a low refractive layer on a surface of a transparent cellulose triacetate (TAC) film having a thickness of 80 μm, the coating solution for a low refractive layer prepared in the Example 1 and hard coating solution (Kyoeisha, HX-610UV) were adjusted using a wire bar so as to have a thickness of 120 nm and 5 μm, respectively. After lamination of each layer, the anti-reflection film was manufactured by independent drying and curing processes. The drying was performed for 1 minute at 90° C., and UV-curing was performed using a high voltage mercury lamp (120 W/cm) for 10 seconds.

Example 6

Manufacturing of an Anti-Reflection Film

The anti-reflection film was manufactured by the same method as that of Example 5 except for using the coating solution prepared in Example 2.

Example 7

Manufacturing of an Anti-Reflection Film

The anti-reflection film was manufactured by the same method as that of Example 5 except for using the coating solution prepared in Example 3.

Example 8

Manufacturing of an Anti-Reflection Film

The anti-reflection film was manufactured by the same method as that of Example 4 except for using the coating solution prepared in Example 5.

Experimental Example 1

Average reflectance, transmissivity, and haze of the manufactured anti-reflection film were measured, and the results are shown in Table 4.

1) Reflectance estimation: After a back surface of the coating film was blackened, the reflectance was measured using Solid Spec 3700 spectrophotometer (Shimadzu Company) to thereby estimate as a minimum reflectance value.

2) Transmissivity and haze estimation: The transmissivity and haze of the coating layer were measured according to JIS K7105 standard using HM-150 (Murakami Corporation).

TABLE 4

| Coating solution for a low refractive layer | Average reflectance (%) | Transmissivity (%) | Haze (%) |
|---|---|---|---|
| Example 1 | 1.3 | 93.5 | 0.3 |
| Example 2 | 1.2 | 94 | 0.3 |
| Example 3 | 1.1 | 93.8 | 0.4 |
| Example 4 | 1.25 | 94 | 0.3 |

As shown in Table 4, it may be appreciated that the anti-reflection films manufactured using the coating solution for a low refractive layer of Examples 1 to 4 have average reflectance of 1.1 to 1.3% to have excellent anti-reflection effect. In addition, the higher the content of fluorine is, the larger the haze value may be. However, the anti-reflection films manufactured using the coating solution for a low refractive layer of Examples 1 to 4 has shown a low haze value of 0.3 to 0.4%. The coating solutions for a low refractive layer of Examples 1 to 4 have the same composition except for a kind of fluorine compound. As a result, it may be appreciated that the fluorine-containing compound having a specific structure is included in a coating composition for a low refractive layer as an essential component to assist in anti-reflection effect by using a low refractive material such as hollow silica, or the like.

As set forth above, the coating composition for a low refractive layer according to the present invention includes the fluorine-containing compound having excellent optical characteristics such as a low refractive index of 1.28 to 1.40 and excellent mechanical characteristics, such that the refractive index of the anti-reflection film may be easily adjusted. In addition, the anti-reflection film manufactured using the coating composition for a low refractive layer may have excellent optical and mechanical characteristics such as a low reflectance and excellent visible light transmissivity.

What is claimed is:

1. A coating composition for a low refractive layer including a fluorine-containing compound represented by Chemical Formula 1

[Chemical Formula 1]

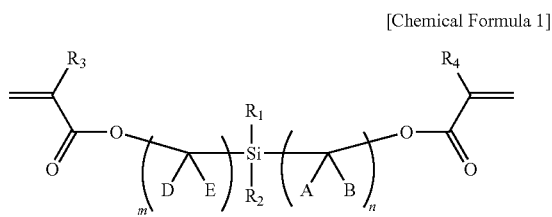

in Chemical Formula 1,
$R_1$ to $R_4$ are each independently hydrogen, $(C_1-C_{20})$alkyl, or $(C_6-C_{20})$aryl, and $R_1$ and $R_2$ are not hydrogen at the same time;
m and n are each independently an integer of 2 to 10;
A, B, D, and E are each independently hydrogen, fluorine, or $(C_1-C_4)$alkyl, provided that a content of fluorine in a content of an entire atoms of A, B, D, and E is 50% or more; and
the alkyl and aryl of $R_1$ to $R_4$ are optionally further substituted with fluorine.

2. The coating composition for a low refractive layer of claim 1, wherein the fluorine-containing compound of Chemical Formula 1 is contained in a content of 1 to 50 weight % of an entire solid content of the coating composition for a low refractive layer.

3. The coating composition for a low refractive layer of claim 1, wherein the coating composition includes the fluorine-containing compound of Chemical Formula 1, a compound having an acrylic unsaturated group, a low refractive index particle, a photo-initiator, and a solvent.

4. The coating composition for a low refractive layer of claim 3, wherein the compound having an acrylic unsaturated group is contained in a content of 5 to 40 weight % of an entire solid content of the coating composition for a low refractive layer.

5. The coating composition for a low refractive layer of claim 1, wherein the fluorine-containing compound of Chemical Formula 1 has a refractive index of 1.28 to 1.40.

6. The coating composition for a low refractive layer of claim 1, wherein the fluorine-containing compound of Chemical Formula 1 is selected from:

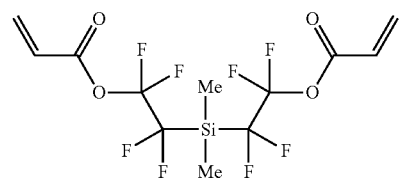

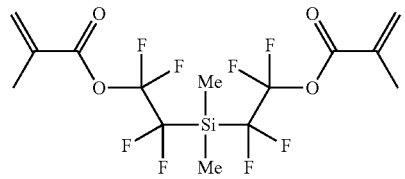

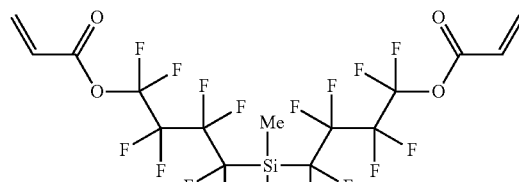

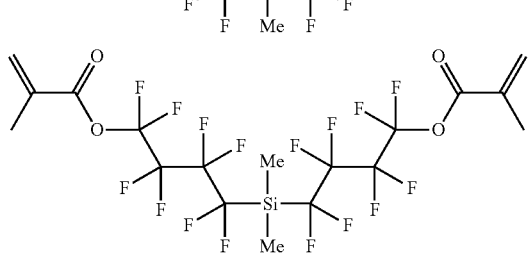

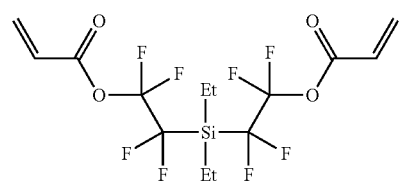

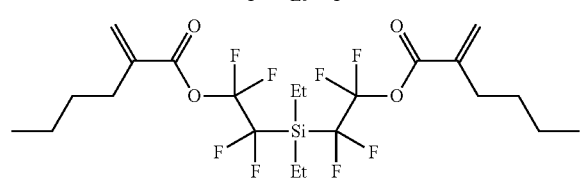

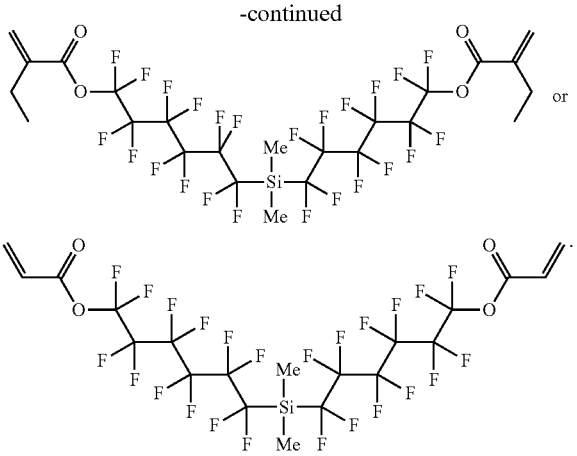

7. The coating composition for a low refractive layer of claim 1, wherein the low refractive layer has a refractive index of 1.28 to 1.4.

8. An anti-reflection film comprising a low refractive layer made of the coating composition for a low refractive layer of claim 1.

9. The anti-reflection film of claim 8, wherein the anti-reflection film includes the low refractive layer coated on a transparent substrate.

10. The anti-reflection film of claim 8, wherein the anti-reflection film includes a hard coat layer and the low refractive layer sequentially coated on a transparent substrate.

11. A polarizer comprising the anti-reflection film of claim 8.

12. An image display device comprising the polarizer of claim 11 formed on a top surface thereof.

* * * * *